(12) United States Patent
Muller et al.

(10) Patent No.: US 7,035,450 B1
(45) Date of Patent: Apr. 25, 2006

(54) METHOD FOR LOCATING AN ELEMENT OF INTEREST CONTAINED IN A THREE-DIMENSIONAL OBJECT, IN PARTICULAR DURING A STEREOTACTIC INVESTIGATION IN THE X-RAY EXAMINATION OF THE BREAST

(75) Inventors: Serge Muller, Guyancourt (FR); Michel Grimaud, Paris (FR); Robert Heidsieck, Rocquencourt (FR); Thierry Salmon Legagneur, Paris (FR); Sylvie Bothorel, Boulogne-Billancourt (FR)

(73) Assignee: GE Medical Systems SA, (FR)

( * ) Notice: Subject to any disclaimer, the term of this patent is extended or adjusted under 35 U.S.C. 154(b) by 0 days.

(21) Appl. No.: 09/214,822

(22) Filed: Jan. 11, 1999

Related U.S. Application Data

(63) Continuation of application No. PCT/FR97/01232, filed on Jul. 8, 1997.

(30) Foreign Application Priority Data

Jul. 9, 1996 (FR) .................................. 96 08542

(51) Int. Cl.
*G06K 9/00* (2006.01)

(52) U.S. Cl. ...................................... 382/154; 382/128

(58) Field of Classification Search ................ 382/285, 382/279, 203, 154, 128, 131–133; 600/417, 600/429; 606/130; 128/916
See application file for complete search history.

(56) References Cited

U.S. PATENT DOCUMENTS 4,589,140 A * 5/1986 Bishop et al. ................. 382/8
4,991,092 A * 2/1991 Greensite ............... 364/413.13
5,142,557 A * 8/1992 Toker et al. .................. 378/37
5,220,441 A * 6/1993 Gerstenberger ............. 358/487
5,261,404 A * 11/1993 Mick et al. ............... 128/653.1
5,347,594 A 9/1994 Grimaud
5,376,795 A * 12/1994 Hasegawa et al. ..... 250/363.04

(Continued)

FOREIGN PATENT DOCUMENTS

WO 9206444 4/1992

OTHER PUBLICATIONS

Pratt, Digital Image Processing, Second Edition, Wiley & Sons, 1991. p. 669.*

(Continued)

*Primary Examiner*—Vikkram Bali
(74) *Attorney, Agent, or Firm*—Cantor Colburn LLP

(57) ABSTRACT

The stereotaxic images being digitized, a target pixel in a target region of interest is selected, a target window of chosen dimensional characteristics and containing the said target region of interest is generated around the selected target pixel, a set of pixels is determined in a second image, according to a predetermined selection criterion, a second window, of the same dimensional characteristics as the said target window, is generated around each selected pixel, a correlation processing between the grey-scale levels of the pixels of each second window and the grey-scale levels of the pixels of the target window is carried out so as to obtain a correlation value for each second window, and the region of interest homologous to the target region of interest is identified on the basis of the analysis of the set of correlation values thus obtained, so as to minimize the risks of matching error between the homologous regions of interest. The element of interest is then located on the basis of the positions of the two homologous regions.

22 Claims, 5 Drawing Sheets

U.S. PATENT DOCUMENTS

| | | | | |
|---|---|---|---|---|
| 5,381,791 | A | * | 1/1995 | Qian .......................... 128/659 |
| 5,394,875 | A | * | 3/1995 | Lewis et al. ........... 128/660.09 |
| 5,515,853 | A | * | 5/1996 | Smith et al. ........... 128/661.01 |
| 5,526,812 | A | * | 6/1996 | Dumoulin et al. ....... 128/653.1 |
| 5,544,219 | A | | 8/1996 | Muller et al. |
| 5,568,384 | A | * | 10/1996 | Robb et al. ............ 364/419.13 |
| 5,588,033 | A | * | 12/1996 | Yeung ........................... 378/4 |
| 5,632,276 | A | * | 5/1997 | Eidelberg et al. ........ 128/653.1 |
| 5,699,798 | A | * | 12/1997 | Hochman et al. ........ 128/653.1 |
| 5,776,062 | A | * | 7/1998 | Nields ........................ 600/407 |
| 5,836,872 | A | * | 11/1998 | Kenet et al. ................ 600/306 |
| 5,845,639 | A | * | 12/1998 | Hochman et al. ........ 128/653.1 |

OTHER PUBLICATIONS

Russ, Image Processing Handbook, 2nd Edition, CRC PRess, p. 342, 1991.*

Masatoshi Okutomi et al, Systems & Computers in Japan, vol. 23, No. 8, 1992 pp. 669-677.

* cited by examiner

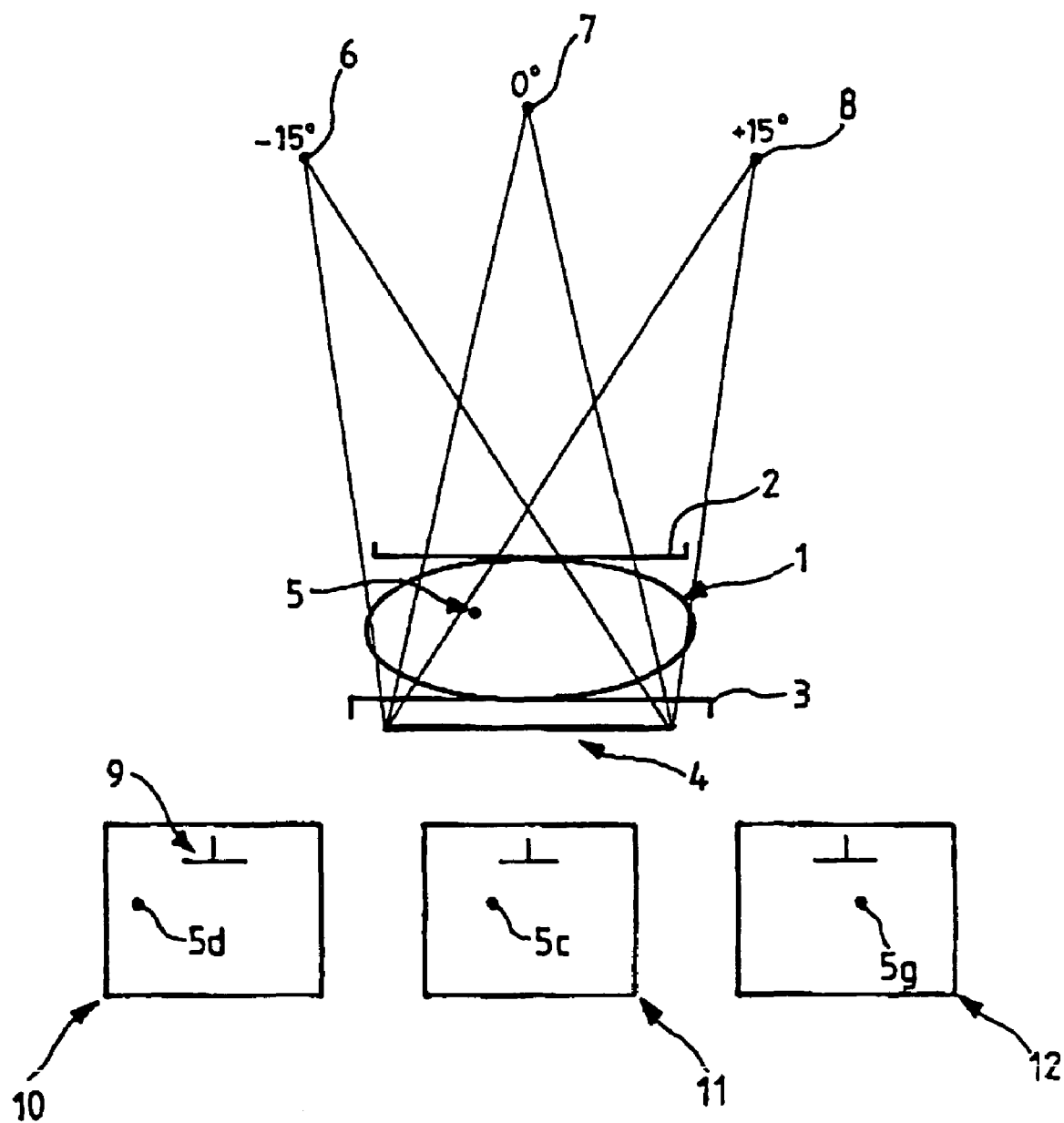

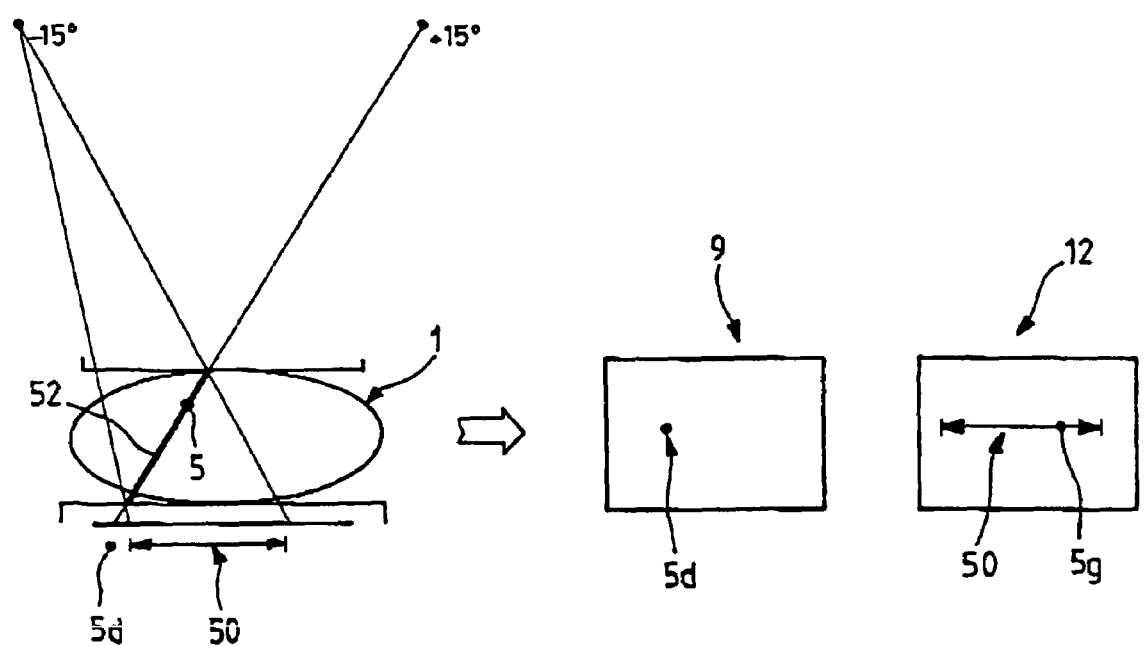
FIG_2

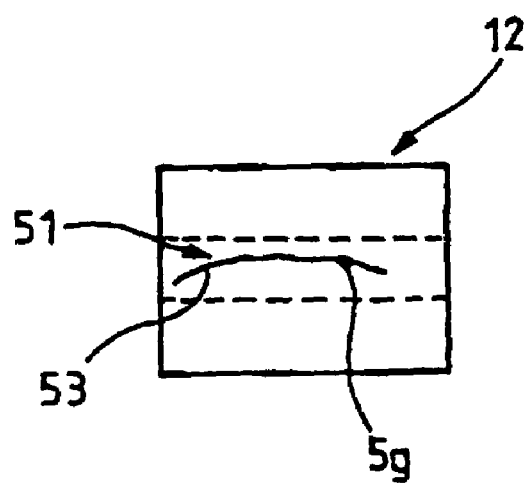
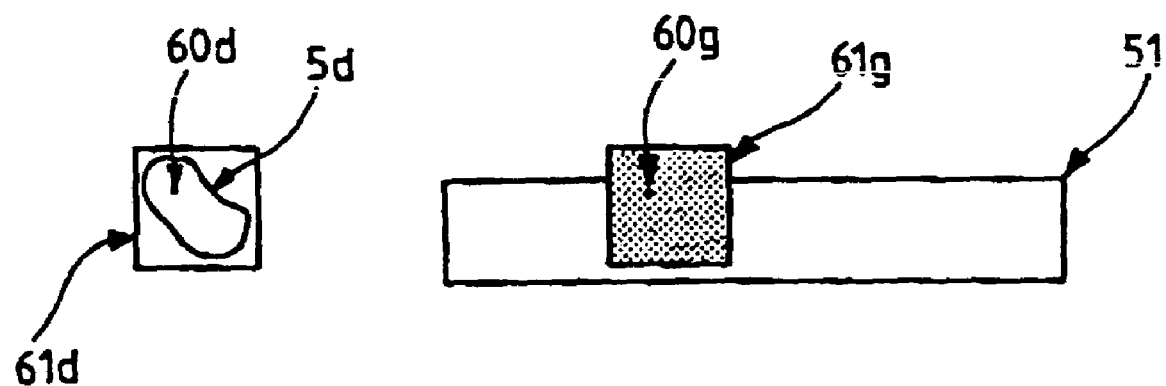

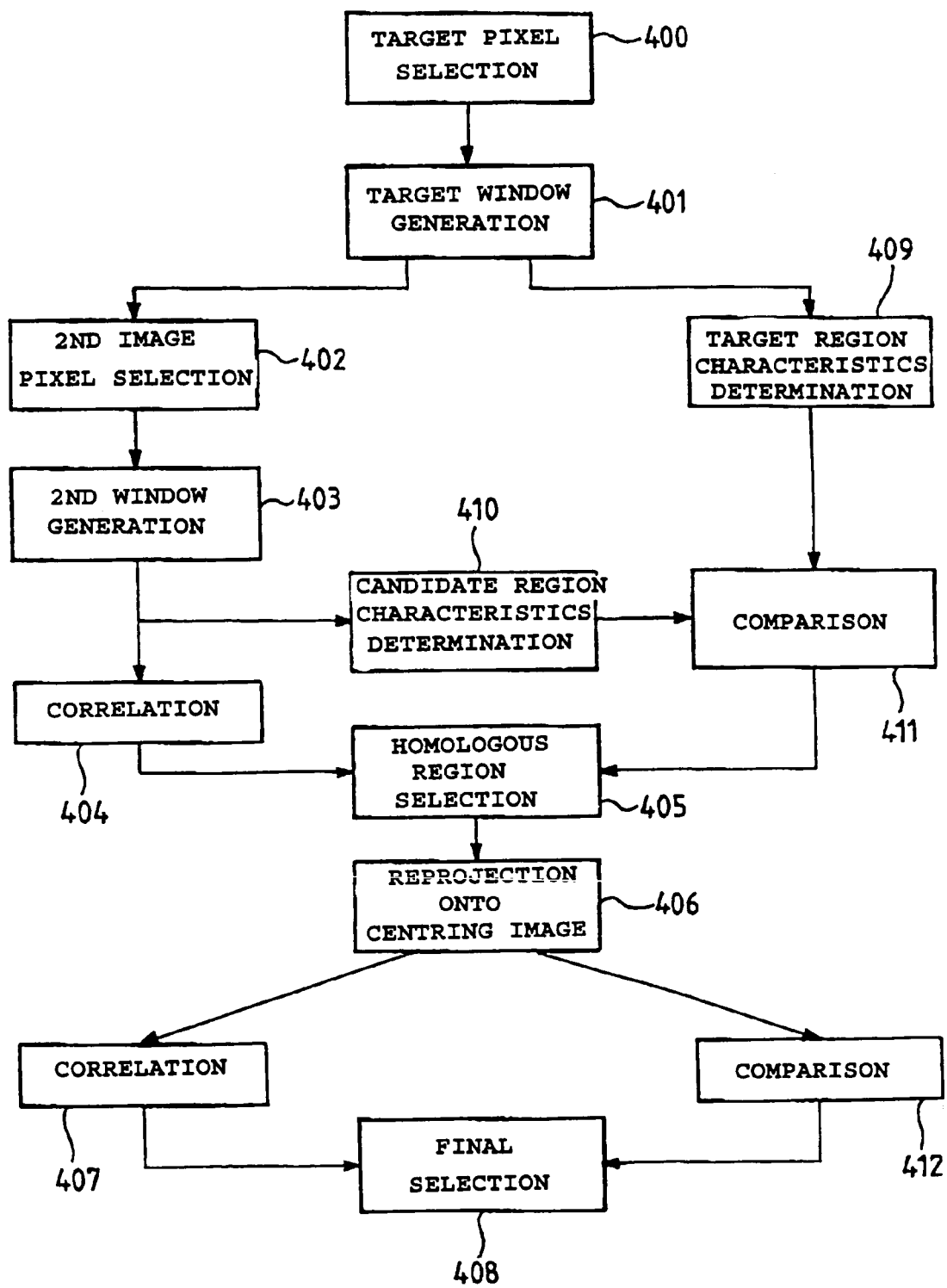
FIG_4

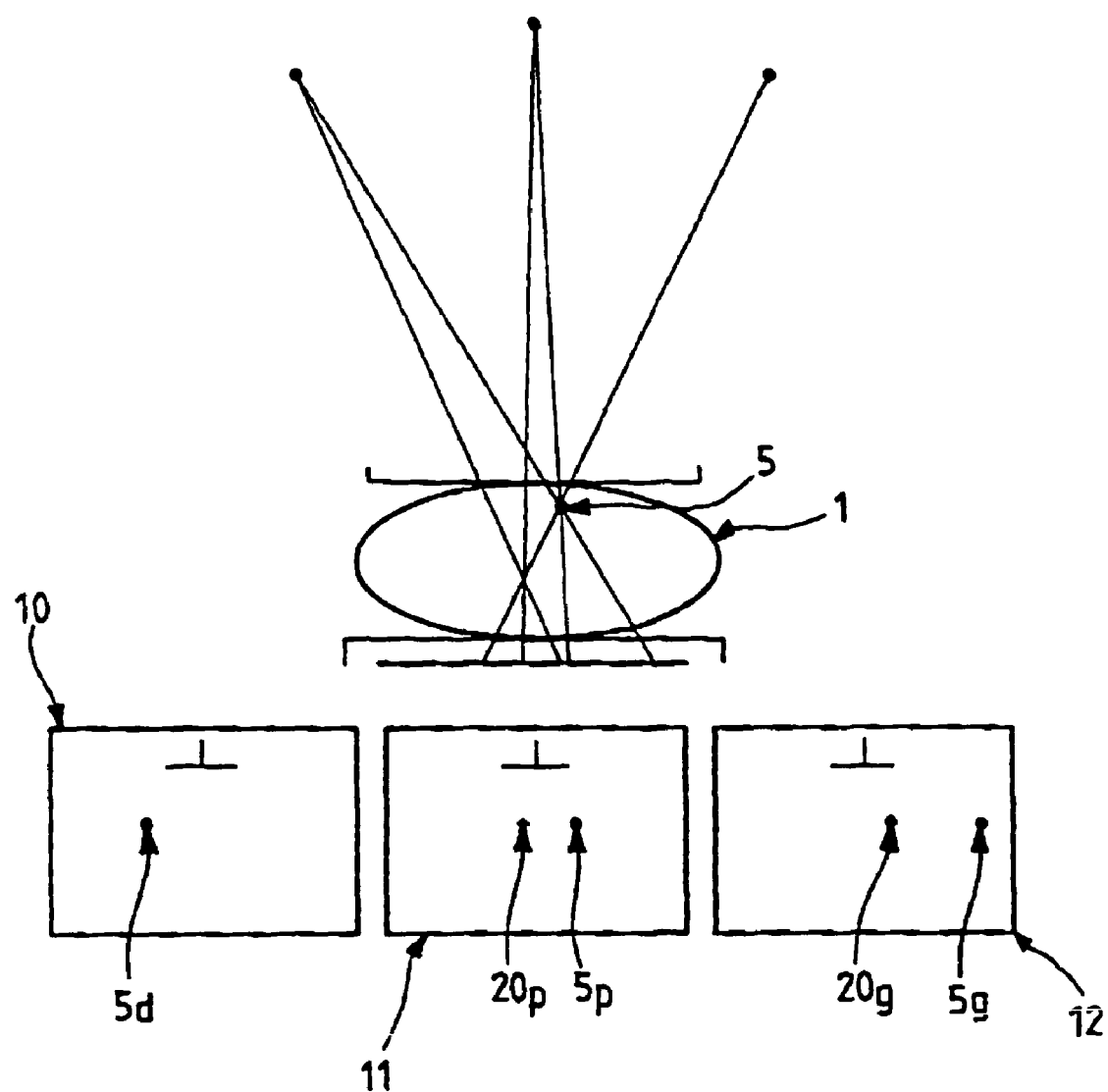

METHOD FOR LOCATING AN ELEMENT OF INTEREST CONTAINED IN A THREE-DIMENSIONAL OBJECT, IN PARTICULAR DURING A STEREOTACTIC INVESTIGATION IN THE X-RAY EXAMINATION OF THE BREAST

This is a continuation application of International Application No. PCT/FR97101232 filed Jul. 8, 1997.

BACKGROUND OF THE INVENTION

The invention relates to the location of an element of interest contained in a three-dimensional object on the basis of the positions of homologous regions of interest corresponding to the said element of interest and appearing in a set of stereotaxic images of the said object.

Although the invention is applicable to any set of stereotaxic images of an arbitrary three-dimensional object, it is particularly useful in the medical field and, in particular, during a stereotaxic examination in mammography in order to locate microcalcifications in a breast.

A stereotaxic examination in general makes it possible to access, with high precision of the order of one millimeter, a given point of a three-dimensional object, on the basis of two two-dimensional projections of this object acquired, for example, at two opposite angular incidences on either side of the normal to the plane of the image receiver delivering the said projections on the basis of the knowledge, on the one hand, of the position of the projection of this point into the plane of each stereotaxic image obtained and, on the other hand, of the geometry of the stereotaxic imaging apparatus which has led to the construction of the two images, it is possible to calculate the exact spatial position of this point in the three-dimensional object, by trigonometric calculation.

In summary, a stereotaxic examination generally requires:
  at least two images of the object at different angulations, and
  perfect knowledge of the acquisition geometry of the stereotaxic system, the ability to locate the site of the projection of the chosen element of interest on the various stereotaxic images obtained.

The first two requirements do not pose a major problem. Currently, stereotaxic examination in mammography is carried out with the aid of a mammograph equipped with a stereotaxic imaging device. The mammograph comprises an X-ray tube located at the end of a first arm which is mobile about an axle and emitting X-radiation to a receiver located at the end of another arm. A breast support plate, or patient support plate, on the one hand and, on the other hand, a compression plate which holds the breast in place during the mammography, are arranged between the tube and the receiver. The image receiver may be a digital receiver, such as a CCD camera, for example, delivering digitized stereotaxic images. The stereotaxic imaging requires the X-ray tube to be rotated around the breast support and compression plates, in two successive opposite orientations on either side of its initial position perpendicular to the plane of the image receiver.

On the basis of the digitized stereotaxic images, obtained, the location of the element of interest on the various images is a difficult operation, in particular in mammography, since it requires corresponding homologous regions of interest in two different stereotaxic images to be set in correspondence or matched with a single element of interest located in the breast.

Thus, in mammography, an attempt is made to match the regions of interest which correspond to the same microcalcification on the various stereotaxic images obtained.

However, the matching of the projected microcalcifications is a difficult problem because the microcalcifications do not look the same from one image to another. Their shape and their contrast may change, as may their arrangement in space. They may be superposed with fibrous zones or with other microcalcifications.

To date, the matching has been carried out entirely manually by the radiologist. The latter would chose those regions of interest which were correspondence on the two angulated stereotaxic images, then enter the two-dimensional coordinates of these regions into a computer which gave the spatial position of the microcalcification, that is to say the three-dimensional coordinates of the latter. On the basis of these coordinates, the radiologist could adjust, for example, the position of a needle holder so that the needle becomes aligned with the microcalcification, in 10 order for it to be punctured, for example.

However, this entirely manual matching proves to be a time-consuming and sometimes inaccurate step.

BRIEF SUMMARY OF THE INVENTION

The purpose of the invention is to substantially reduce the duration of a stereotaxic examination and to obtain better matching precision.

In an embodiment of the invention, a similarity measurement is defined, making it possible to evaluate the resemblance between a region of interest (microcalcification, for example) selected (manually by the radiologist, for example, or else automatically by an automatic selection method) on one of the angulated stereotaxic images and a region of interest of a second stereotaxic image.

On the basis of this similarity measurement, a number of "candidates" belonging to a search zone and having a high degree of resemblance to the initial microcalcification are selected in order to obtain the homologous region of interest.

Next, by using the principles of stereotaxy, the three-dimensional coordinates of these candidates are calculated, then they are reprojected onto the centering image. The similarity between these reprojected points and the microcalcification initially chosen is again calculated. In fact, if the candidate actually corresponds to the initial microcalcification, then its calculated projection will actually correspond to the image of this microcalcification on the centering image.

Finally, with the aid of these two similarity values calculated for each candidate, the best candidate is proposed.

In theory, it would be possible to omit the step of reprojection using the centering image and to make do with the matching as has just been explained in order to select the region of interest homologous to the one selected on the target image. However, it is by far preferable to use the reprojection of the candidates onto the centering image in order to verify the first selection made, in particular in the field of mammography in which the microcalcifications may change shape and contrast from one image to another.

In other words, a method for locating an element of interest contained in a three-dimensional object on the basis of the positions of homologous regions of interest corresponding to the said element of interest and appearing in a set of stereotaxic images image, a first region of interest, in particular a microcalcification, referred to as the target region of interest. The method also includes a matching of the said first region with a second region of interest, homologous to the first and appearing in a second stereotaxic image.

According to a general characteristic of the invention, the stereotaxic images being digitized, a target pixel in the said target region of interest is selected in the selection step. In the matching step, a target window of chosen dimensional characteristics and containing the said target region of interest is generated around the selected target pixel. A set of pixels is then determined in the second image, according to a predetermined selection criterion, and a second window, of the same dimensional characteristics as the said target window, is generated around each selected pixel. A correlation processing is carried out between the grey-scale levels of the pixels in each second window and the grey-scale levels of the pixels in the target window, so as to obtain a correlation value for each second window. The region of interest homologous to the target region of interest is then identified on the basis of the analysis of the set of correlation values thus obtained. The risks of matching error between homologous regions of interest are thus minimized.

According to one embodiment, the analysis of the correlation values obtained includes the selection of a certain number of correlation maxima or minima, the homologous region being selected from those whose associated correlation value is one of these correlation maxima or minima.

In fact, depending on whether the image is "normal" or inverted (a "normal" image being defined as having grey-scale levels and contrasts which are similar to those usually visible on film negatives), use will respectively be made of maxima or minima.

It is also possible to provide a determination of the dynamic range of the maxima or minima selected, and the comparison of the obtained dynamic values with a threshold.

The correlation processing used may include a centered or uncentered normalized correlation processing, or else a normalized difference processing.

As a variant to the matching explained above, the invention also proposes a matching based on the treatment of predetermined characteristics of any region of interest, in particular physical characteristics such as extension, contrast and gradient, then a comparison between these lists of characteristics associated with various regions of interest.

More precisely, according to a general characteristic of the invention, a target pixel in the said target region of interest is selected in the selection step and, in the matching step, a target window of chosen dimensional characteristics and containing the said target region of interest is generated around the selected target pixel. On the basis of the grey-scale level values of the pixels in the said target window, a first set of numerical values, respectively representing predetermined characteristics characterizing any region of interest (for example shape, contrast or gradient characteristics, etc.) is determined for the said target region of interest, and this first set of numerical values is stored. In the second image, according to a predetermined selection criterion, a set of pixels belonging respectively to so-called candidate regions of interest appearing in the second images is determined, and a second window, containing the said corresponding candidate region of interest, is generated around each of these selected pixels. For each candidate region of interest, a second set of numerical values, respectively, is representing the said predetermined characteristics, is determined on the basis of the grey-scale level values of the pixels in the associated second window, and this second set of numerical values is stored. The region of interest homologous to the target region of interest is then identified on the basis of a comparison processing between the first set of numerical values and each second set of numerical values. The risks of matching error between homologous regions are thus minimized.

The comparison processing may include a distance minimization processing between the two sets of numerical values.

In the two matching variants which have just been explained, and in order to further minimize the calculation time an epipolar zone containing at least the epipolar segment relating to the target pixel is determined in the second stereotaxic image. The pixels in the epipolar zone then contain the selected pixels. In order to reduce the calculation time further, instead of performing matching on all the pixels in the determined epipolar zone, the pixels in the second image are advantageously selected from those having grey-scale level maxima or minima whose dynamic range is greater than a predetermined threshold.

Furthermore, in order to overcome the image background problems, and in order to further minimize the risks of matching errors between two homologous regions of interest, it is particularly advantageous for the matching according to the invention to include a prior filtering of the stereotaxic images, for example of the so-called "top-hat transformation" type.

The use of the step of reprojecting the candidate elements of interest into the centering image is independent of the type of matching previously used.

Thus, according to a general characteristic of the invention, the location method of the type explained above comprises a selection, in a first digitized stereotaxic image, of a first so-called target region of interest, a selection, in a second digitized stereotaxic is image, on the basis of a first automatic matching, of at least one second region of interest which may be homologous to the target region, the determination of the spatial position of a candidate pixel of a candidate element of interest corresponding to these two regions of interest, the determination of the position, in a third stereotaxic image, of a projected pixel corresponding to the projection into this third stereotaxic image of the candidate pixel, and a second automatic matching between the target region of interest and a vicinity of the projected pixel, defining a projected region of interest.

In practice, a set of second regions which may be homologous to the target region is advantageously selected in the second stereotaxic image, on the basis of the said first automatic matching, and the spatial position of each candidate pixel corresponding to each pair of regions of interest which is formed by the target region and one of the second regions is determined. The position in the third image of each corresponding projected pixel is also determined and the second automatic matching between the target region and a vicinity of each projected pixel is carried out.

It is possible to order the set of second regions obtained in decreasing order of their probability of being the region homologous to the target region. It is also possible to order the set of projected regions obtained in decreasing order of their probability of being the region homologous to the target region. The region homologous to the target region is then advantageously selected as being the one whose product of the respective ranks in the two orderings is a minimum.

The first automatic matching may be one of the two matchings which have been explained above, that is to say based on a correlation processing or on a comparison processing.

Similarly, the second automatic matching may include a correlation processing as defined above, between the vicinity of each projected pixel and a target window containing the target region of interest. This second automatic matching may also be a comparison processing as defined above, between the target region of interest and each projected region of interest.

From a hardware point of view, the invention can be regarded as a device for locating an element of interest contained in a three-dimensional object on the basis of the positions of homologous regions of interest corresponding to the said element of interest and appearing in a set of stereotaxic images of the said object. This device includes a stereotaxic imaging apparatus equipped with a support for the said object and an image receiver such as a CCD camera capable of providing digitized stereotaxic images. Means for displaying these images are also provided, for example a video screen, such as that of a microcomputer. Selection means, for example a "mouse" of a microcomputer, make it possible to move a cursor on the screen and to "click" this marker onto a target pixel of a region of interest, making it possible to select the target pixel. Finally, a microprocessor and associated memories are provided in order to incorporate, in software form, means making it possible to functionally implement all the steps of the methods which have been described above.

BRIEF DESCRIPTION OF THE DRAWINGS

Other advantages and characteristics of the invention will emerge on examining entirely non-limiting embodiments, and the appended drawings, in which:

FIG. 1 is a schematic view of three stereotaxic images of a three-dimensional object from a stereotaxic imaging device;

FIG. 2 very schematically illustrates the notion of an epipolar segment;

FIG. 3 illustrates an epipolar zone chosen according to the invention in order to perform a matching;

FIG. 4 is a general flow chart of a method of an embodiment of the invention;

FIG. 5 more particularly illustrates a step of a variant of the method, using a correlation processing; and FIG. 6 schematically illustrates, more particularly, a method of an embodiment of the invention using reprojection, onto the centering image.

DETAILED DESCRIPTION OF THE INVENTION

A stereotaxic examination, in particular in mammography, is composed of a series of three exposures of a three-dimensional object 1 (FIG. 1), for example a breast, resting on a support 3 and compressed by a compression plate 2, with the aid of an X-ray tube which respectively occupies three different positions 6, 7, and 8. In practice, one exposure is taken at an angle of 0° and two exposures are taken angulated at two equal and opposite angles, in practice ±15°.

A CCD receiver 4 thus makes it possible to obtain three digitized stereotaxic images 10, 11 and 12. According to a convention which is normally used, the image 10 is the right image, while the image 12 is the left image and the image 11 is the centering image.

An element of interest 5, for example a microcalcification, contained in the three-dimensional object 1 provides regions of interests, respectively referenced 5d, 5c and 5g, on each of the images 10, 11 and 12. The centering image is used in particular to check that the microcalcification will be accessible during the possible subsequent medical intervention.

The three-dimensional coordinates of the microcalcification 5 can be obtained, in a way which is conventional and well-known to the person skilled in the art, by a simple trigonometric calculation on the basis of the knowledge of the two-dimensional coordinates of the two projections 5d and 5g, for example. These coordinates are expressed with respect to an origin manifested by the center of a cross 9 etched on the plate supporting the breast, and the center of this reference cross is identified on each image in order to geometrically initialize the system.

A person skilled in the art knows that, by definition, the epipolar segment 50 (FIG. 2) of a point 5d of an image 9 of angulation θ1, on an image 12 of angulation θ2, corresponds to the set of points in the second image 12 which may have the point 5d as antecedent. In other words, it is the conical projection, by the source of angulation θ2, of the straight-line segment 52 joining the said point to the source of angulation θ1.

In the case where the stereotaxic images have been obtained with angulations such that the positions of the X-ray tube lie in a plane parallel to the lines of the images, this epipolar segment 50 is a straight-line segment which is found to be parallel to the lines of the image. However, if the thickness of the three-dimensional object is not known, it is not possible to determine the position of the ends of this epipolar segment.

This epipolar segment then becomes an epipolar straight line which, in the particular acquisition geometry explained here, lies on the same image line 12 as the point of interest 5d on the image 9.

Furthermore, when use is made of a detector which has geometrical distortions, the epipolar straight-line is converted into an epipolar curve 53 (FIG. 3). It is possible to determine the coordinates of the set of points on the epipolar curve on the image 12 by a geometrical calibration of the CCD camera. It would then be possible to perform the matching according to the invention only on this set of points.

If, however, for reasons of precision of the geometrical calibration, the coordinates of the points on the epipolar curve can only be determined approximately, the choice will then be made to perform the matching according to the invention on an epipolar strip 51 which contains the epipolar curve. In practice, an epipolar zone, or search zone, bounded by two parallel lines passing respectively through two points augmented, on either side of the uppermost and lowermost points of the epipolar 53 by a predetermined margin, will be defined. A margin of 3 to 5 pixels will generally be opted for.

A more detailed description will now be given, with reference more particularly to FIGS. 4 and 5, of two types of matching in embodiments of the invention.

The first step consists in the selection (step 400) of a target pixel 60d within a target region of interest 5d present, for example, in the right image 10, referred to as the target image. In practice, this selection can be made manually by clicking on a point of the region of interest in the image in question appearing on a screen of a microcomputer. This being the case, it is also possible to provide an automatic pixel selection method. This pixel 60d may or may not be centered in the target region.

Next (step 401), a target window 61d containing the said target region of interest is generated. This target window can be generated automatically after having applied a conventional region-increase software tool to the target pixel 60d. As a variant, depending on the field of application of the invention, provision may also be made to choose windows of predetermined size. In all cases, a rectangular or square target window will generally be obtained, the sides of which have dimensions of the order of ten to a few tens of pixels.

The grey-scale levels of each of the pixels in this target window are then stored in a memory associated with a microcomputer which incorporates as software all the functional tools for implementing the described method.

On this basis, a set of pixels in a second stereotaxic image, for example the left image, will be selected in a step 402. This set of selected pixels will constitute a search zone 51 within which one or more candidate regions of interest which may be homologous to the target region of interest will be selected.

As explained above, and with the aim of reducing the matching time, this search zone 51 will, for example, be the epipolar zone 51 described above. More precisely, a second window 61g of the same dimensional characteristic as the target window will be generated (step 403) around each of the pixels selected in the search zone. The grey-scale levels of the pixels in each second window are stored and a correlation processing is carried out (step 404) between the grey-scale levels of the pixels in each second window 61g and the grey-scale levels of the pixels in the target window 61d.

The correlation processing then makes it possible to perform a similarity measurement between the target window and each of the second windows of the second image, so as to obtain a similarity value (correlation value between these two windows).

It is on the basis of the analysis of these correlation values that the target region of interest will be matched with its homologous region of interest.

As regards to the correlation processing (step 404), use may be made of a normalized correlation. More precisely, each correlation value of a second window will then be given by the formula:

$$\frac{\sum_{K=1}^{N} I(k)J(k)}{\sqrt{\sum I^2(k) \sum J^2(k)}} = \frac{\vec{I}}{\|\vec{I}\|} \cdot \frac{\vec{J}}{\|\vec{J}\|}$$

Where N is the—number of pixels in a window, k the running index of a pixel, I(k) the grey-scale level of the pixel k in the target window and J(k) the grey-scale level of the pixel k in the second window.

It is also possible to use a normalized difference, making it possible to obtain the correlation value by the formula:

$$\|\vec{I} \cdot \vec{J}\|^2$$

In theory, the homologous region of interest will be the one contained in the second window which has the maximum correlation value. This being the case, several correlation values may in practice be found with a high intensity. A restricted set of correlation maxima are then selected (step 405) from the set of correlation values, according to a predetermined criterion such as the intensity of the maximum or such as the number of maxima in the list of correlation values ranked in decreasing order of intensity.

It is also possible to use, as an additional selection criterion, a determination of the dynamic range of the maxima selected and the comparison of the dynamic values obtained with a predetermined threshold. The determination of the dynamic range of maxima is perfectly known to the person skilled in the art. However, he may optionally refer to French Patent Application No. 91 15308 for more details regarding such a dynamic-range determination. It should be noted here that the method in the embodiments of the invention makes it possible to determine, and display on the screen of the microcomputer, for example by flashing, the region of interest considered as being the region homologous to the target region, and to do this with the minimum risk of error.

This being the case, the method in the embodiments of the invention will in practice be able to select a restricted number of candidate regions of interest which may be homologous to the target region. The radiologist will then have the possibility of manually selecting the one which he considers to be the actual homologous region.

As explained above, a specific comparison processing may be used instead of a correlation processing in the matching processing.

Thus, as more precisely illustrated in FIG. 4, a list of characteristics allowing general characterization of a region of interest is determined (step 409) for the target region contained inside the target window 61d, and on the basis of the grey-scale levels of the pixels contained in this target window. These characteristics may include, for example, a value representing the extension of the region of interest, a value representing its mean width, a value representing its mean grey-scale level, or its mean intensity gradient.

The same operation (step 410) is performed for the candidate regions of interest contained in second windows 61g defined on the basis of pixels selected in the search zone. In this regard, in order to limit the processing time, the pixels selected for the determination of the second windows encompassing the candidate regions are chosen from the pixels of the search zone which have grey-scale maxima whose dynamic range is greater than a predetermined threshold.

On the basis of these various lists of characteristics thus obtained, a comparison processing 411 is carried out between the list of characteristics assigned to the target region and each of the lists of characteristics assigned to each of the candidate regions.

In practice, although another type of comparison processing may be envisaged, use will preferably be made of a comparison processing which provides for the minimization of a distance, for example the Euclidean distance, between the list of characteristics of the target region, then considered as a vector, and a list of characteristics of a candidate region, also considered as a vector.

By way of example, provision can also be made to determine the mean value of the absolute values of the differences between the homologous values of two lists of characteristics, and to search for the lowest of the mean values in order to deduce the homologous region of is interest therefrom.

The selection of the homologous region provided in step 405 is thus obtained, with this variant, by minimizing a distance between lists of characteristics, rather than by maximizing a normalized correlation or a normalized difference.

The invention provides some further improvements.

Thus, in the matching variant providing for a correlation processing, it is possible to limit the search zone to those pixels of the epipolar zone which have grey-scale level maxima whose dynamic range is greater than a predetermined threshold.

It is furthermore preferable, in particular in order to overcome the image background problems, to filter the stereotaxic images beforehand, with filtering of the "top-hat transformation" type. This type of filtering is known to the person skilled in the art and for more details he may refer to the article by J. SERRA Image Analysis and Mathematical Morphology, Vol. 2, Academic Press 1988.

This type of filtering makes it possible to extract the light and narrow regions of a digital image and makes it possible to overcome the background.

The steps of the method in the embodiments of the invention which will now be described, and providing in particular for reprojection onto the centering image, thus, in particular, equate to a verification of the results of the preceding matching between the target image and the second image, and thus make it possible to further minimize the risks of matching errors.

This being the case, although the rest of the method, which will now be described with more particular reference to FIGS. 4 and 6, provides the possibility of using correlation or comparison processings of the type already described, this method according to the invention, using reprojection onto the centering image, is independent of the prior matching used between the target image and the second image.

It is now assumed (FIG. 6) that the method according to the invention has made it possible to select, on the left image 12, two candidate regions of interest 5g and 20g which may be the region homologous to the target region 5d appearing on the target image 10.

On the basis of the target pixel in the target region of interest and of the candidate pixel which has given rise to the selection of the candidate region of interest 5g, a stereotaxic trigonometric calculation and knowledge of the geometry of the stereotaxic device are used to determine (step 406) the three-dimensional coordinates of the corresponding point of the candidate object of interest corresponding to these two regions 5d and 5g. Then, by inverse stereotaxic trigonometric calculation, the coordinates in the centering image of the projected pixel corresponding to the projection of the pixel of the candidate element into this centering image are determined.

It can, therefore, be seen that, in the present case, since the candidate region 5g is effectively the region homologous to the region 5d, the position of the pixel projected into the centering image 11 actually corresponds to a projected region of interest 5p which is actually the projection of the element of interest 5 into this centering image.

In contrast, using the same calculations, the candidate region of interest 20g will lead to a projected position 20p in the centering image being obtained which, in the present case, will not be superposed with any region of interest physically present in this centering image.

Thus, a correlation processing between the target window containing the target region 5d and a vicinity of the projected pixel, containing the projected region of interest 5p, will give a correlation value greater than the correlation value obtained between the target window 5d and a vicinity of the projected pixel 20p. The same would have been true even if the vicinity of the projected point 20p had corresponded to a projected microcalcification other than the one actually corresponding to the microcalcification 5.

This method therefore makes it possible to select, from the two candidates 5g and 20g, the region 5g which is actually the region homologous to the region 5d.

Of course, the conclusion would have been the same when using a comparison processing 412 instead of a correlation processing 407.

The use of a vicinity of the projected pixel, typically a few pixels around the projected point, makes it possible to account for the possible errors due to a shift in the object between the exposure at 0° and the exposures at ±15°.

More generally, the set of candidate regions obtained in the second image can be ordered in decreasing order of their probability of being the region homologous to the target region. Thus, the region which has, for example, given the correlation maximum with the greatest dynamic range will be assigned rank 1, and so on in decreasing order. The same ordering can be performed for the set of projected regions obtained on the centering image. The region homologous to the target region will then be selected as being the one for which the product of the respective ranks in the two orderings is a minimum.

Various modifications in structure and/or function and/or steps may be made by one skilled in the art without departing from the scope and extent of the invention.

What is claimed is:

1. A method for locating an element of interest contained in a three-dimensional object comprising:
    providing a set of images having at least first and second digitized stereotaxic images having positions of homologous regions of interest corresponding to the element of interest and appearing in the set of stereotaxic images;
    selecting in a first stereotaxic image a first target region of interest having a target pixel;
    matching the first target region of interest with a second region of interest homologous to the first target region of interest and appearing in the second stereotaxic image;
    generating a target window of chosen dimensional characteristics and containing the selected first target region of interest around pixels of the selected target pixel;
    selecting a set of pixels in the second stereotaxic image according to a predetermined selection criterion so as to generate a second window around each selected pixel, the second window having the same dimensional characteristics as the generated target window;
    processing a correlation between gray-scale levels of the pixels in each second window and the tray scale levels of the pixels in the target window to obtain a correlation for each second window; and
    using the correlation values to identify the region of interest homologous to the target region of interest and thereby minimize the risk of matching error between the homologous regions of interest.

2. The method of claim 1 wherein the correlation values includes the selection of a certain number of correlation maxima or minima, the homologous region of interest being selected from those for which the associated correlation value is one of the correlation maxima or minima.

3. The method of claim 2, wherein an analysis of the correlation values obtained includes a determination of the dynamic range of the maxima or minima selected, and the comparison of the dynamic values obtained with a threshold.

4. The method of claim 1 wherein the correlation processing includes a normalized correlation processing.

5. The method of claim 1 wherein the correlation processing includes a normalized difference processing.

6. The method of claim 1 wherein the matching includes a prior filtering of the stereotaxic images.

7. The method of claim 1 wherein an epipolar zone containing at least an epipolar segment relating to the target pixel is determined in the second stereotaxic image and the pixels in the epipolar zone contain the selected pixels.

8. The method of claim 1 wherein the selected pixels are chosen from the pixels in the second image which have a grey-scale level maxima or minima whose dynamic range is greater than a predetermined threshold.

9. The method of claim 1, wherein the matching comprises the generating of a target window, the selecting of a set of pixels, the processing of a correlation and the using of the correlation values.

10. A method for locating an element of interest contained in a three-dimensional object comprising:
    providing a set of digitized stereotaxic images having positions of homologous regions of interest corresponding to the element of interest and appearing in the set of stereotaxic images;
    selecting in a first stereotaxic image a first target region of interest having a target pixel;
    matching the first region of interest with a second region of interest homologous to the first region of interest and appearing in a second stereotaxic image;
    generating a target window of chosen dimensional characteristics and containing the target region of interest around pixels of the selected target pixel;
    determining and storing a first set of numerical values, respectively representing predetermined characteristics of any region of interest for the target region of interest on the basis of the grey-scale values of the pixels in the target window;
    determining in the second image a set of pixels belonging respectively to candidate regions of interest appearing in the second image according to predetermined selection criterion;
    generating a second window, containing a corresponding candidate region of interest around each of the selected pixels;
    determining and storing a second set of numerical values, respectively representing the predetermined characteristics for each candidate region of interest, on the basis of the grey-scale values of the pixels in the associated second window; and
    identifying the region of interest homologous to the target region of interest on the basis of a comparison processing between the first set of numerical values and each second set of numerical values so as to minimize the risk of matching error between the homologous regions of interest.

11. The method of claim 10 wherein the predetermined characteristics comprise shape, contrast or gradient characteristics.

12. The method of claim 11 wherein the comparison processing includes a distance minimization processing between the two sets of numerical values.

13. The method of claim 10 wherein the comparison processing includes a distance minimization processing between the two sets of numerical values.

14. The method of claim 10 wherein an epipolar zone containing at least an epipolar segment relating to the target pixel is determined in the second stereotaxic image and the pixels in the epipolar zone contain the selected pixels.

15. The method of claim 10 wherein the selected pixels are chosen from the pixels in the second image which have a grey-scale level maxima or minima whose dynamic range is greater than a predetermined threshold.

16. The method according to claim 10 wherein the matching includes a prior filtering of the stereotaxic images.

17. A method for locating an element of interest contained in a three-dimensional object comprising:
    providing a set of digitized stereotaxic images having positions of homologous regions of interest corresponding to the element of interest and appearing in the set of stereotaxic images;
    selecting in a first stereotaxic image of a first target region of interest;
    selecting in a second stereotaxic image on the basis of a first automatic matching at least one second region of interest which may be homologous to the first target region;
    determining the spatial position of a candidate pixel of a candidate element of interest corresponding to the two regions of interest;
    determining the position, in a third stereotaxic image, of a projected pixel corresponding to the projection into the third stereotaxic image of the candidate pixel;
    providing a second automatic matching between the target region of interest and a vicinity of the projected pixel; and
    defining a projected region of interest so as to minimize the risk of matching errors between the homologous regions of interest.

18. The method of claim of claim 17 wherein the selecting in the second stereotaxic image is on the basis of the first automatic matching a set of second regions which may be homologous to the target region;
    determining the spatial position of each candidate pixel corresponding to each pair of regions of interest which is formed by the target region and one of the second regions;
    determining the spatial position in the third image of each corresponding projected pixel; and
    performing the second automatic matching between the target region and a vicinity of each projected pixel.

19. The method of claim 18
    wherein the set of second regions obtained is ordered in the decreasing order of their probability of being in the region homologous to the target region;
    wherein the set of projected regions obtained is ordered in the decreasing order of their probability of being the region of homologous to the target region to form a list of correlated values ranked in decreasing order; and
    wherein the region homologous to the target region is selected as being the one based upon such ranking.

20. The method of claim 17 wherein the first automatic matching is a correlation processing matching.

21. The method of claim 17 wherein the second automatic matching includes a correlation processing matching between the vicinity of each projected pixel and a target window containing the target region of interest.

22. The method of claim 17 wherein the second automatic matching includes a comparison matching between the target region of interest and each projected region of interest.

* * * * *